United States Patent
Robinson

(10) Patent No.: US 9,296,017 B2
(45) Date of Patent: Mar. 29, 2016

(54) MATERIAL SCREENING APPARATUS WITH MULTI-MODE SCREEN BOX

(71) Applicant: Terex GB Limited, Dungannon, County Tyrone (GB)

(72) Inventor: Neil Robinson, Newry (GB)

(73) Assignee: Terex GB Limited, Dungannon, County Tyrone (GB)

( * ) Notice: Subject to any disclaimer, the term of this patent is extended or adjusted under 35 U.S.C. 154(b) by 0 days.

(21) Appl. No.: 14/614,501

(22) Filed: Feb. 5, 2015

(65) Prior Publication Data

US 2015/0224540 A1    Aug. 13, 2015

(30) Foreign Application Priority Data

Feb. 13, 2014    (GB) .................................. 1402521.7

(51) Int. Cl.
*B07B 1/28*     (2006.01)
*B07B 1/42*     (2006.01)
*F16C 39/02*    (2006.01)
*F16C 13/02*    (2006.01)
*B07B 1/36*     (2006.01)
*B07B 1/00*     (2006.01)

(52) U.S. Cl.
CPC .................. *B07B 1/284* (2013.01); *B07B 1/286* (2013.01); *B07B 1/36* (2013.01); *B07B 1/42* (2013.01); *F16C 13/02* (2013.01); *F16C 39/02* (2013.01); *B07B 1/005* (2013.01)

(58) Field of Classification Search
CPC .............. B07B 1/28; B07B 1/34; B07B 1/42; B07B 1/284; B07B 1/286
USPC ............... 209/311, 325, 309, 364, 365.1, 366
See application file for complete search history.

(56) References Cited

U.S. PATENT DOCUMENTS

| | | | | |
|---|---|---|---|---|
| 2,171,355 A | * | 8/1939 | Cole ........................ | B07B 1/284 209/326 |
| 5,328,036 A | * | 7/1994 | Douglas .................... | B07B 1/42 209/366.5 |

FOREIGN PATENT DOCUMENTS

| | | | | |
|---|---|---|---|---|
| DE | 9216239 U1 | 5/1993 | | |
| GB | 751266 A | * | 6/1956 | .............. B07B 1/284 |
| SE | WO 8700093 A1 | * | 1/1987 | ................ B07B 1/42 |
| WO | 8700093 A1 | 1/1987 | | |

OTHER PUBLICATIONS

European Search Report, dated Jul. 13, 2015, for European patent application EP 15154544 corresponding to U.S. Appl. No. 14/614,501.

* cited by examiner

*Primary Examiner* — Terrell Matthews
(74) *Attorney, Agent, or Firm* — Warner Norcross & Judd LLP

(57) ABSTRACT

A material screening apparatus is adaptable between a reduced-bearing mode and an additional-bearing mode. The apparatus comprises a screen box coupled to a frame and comprising at least one screen deck. A rotatable shaft is coupled to the screen box for imparting vibrational and/or oscillatory motion to the screen deck(s). Drive means imparts rotational motion to the shaft and a first set of bearings couples the shaft to the screen box. In the additional-bearing mode only, a second set of bearings couples the shaft to the frame. Changing between modes allows the screening characteristics of the apparatus to be adjusted.

21 Claims, 5 Drawing Sheets

MATERIAL SCREENING APPARATUS WITH MULTI-MODE SCREEN BOX

FIELD OF THE INVENTION

This invention relates to a material screening apparatus, in particular a material screening apparatus, useful in the screening of particulate material.

BACKGROUND OF THE INVENTION

The separation of particulate material into various sizes may be achieved by a process known as screening, or grading. Such processes are routinely used in the mining, quarrying, and mineral processing industries. Screen boxes for screening or grading processes typically comprise one or more screen decks containing a perforated screening surface that acts as a sieve, through which material of a certain size can pass. Screen decks are generally planar and may be inclined so that, when material to be separated is deposited onto the deck at a receiving, optionally raised, end, the material moves along the screening surface towards a discharge, optionally lower, end. The screening surface has apertures through which material of a size defined by the diameter of the aperture may pass, thereby separating out material of a defined size from the original input material. The remaining material, which is too large to pass through the apertures, is discharged from the discharge end of the screen deck to be received by, for example, a hopper, chute or conveyor.

Vibrating screen boxes use a vibrating mechanism to assist in the separation process, as well as in the conveyance of the particulate material from a receiving end to a discharge end. Optionally, if the screen deck is inclined, the effect of gravity assists the movement of the material over the screening surface. The efficiency and nature of the screening process is determined by the angle of the screen deck, as well as the vibratory energy imparted to the screen deck. Furthermore, a number of screen boxes may be used in series in order to provide particular screening characteristics for the screening process.

Vibrating mechanisms are employed to impart vibratory energy to the screen deck(s) of a screen box and are characterized by the form of the vibration and the number of bearings used in the screening apparatus. Vibrating mechanisms may produce vibratory motions that include circular, elliptical, and straight-line reciprocal movement. A screen box typically has two or four bearings by which it is mount to a support frame. A screen box having two bearings will have different screening characteristics than a screen box having four bearings. Therefore, depending on the required screening application a two-bearing screen box and/or four-bearing screen box may be required. However, it can be expensive and inconvenient to provide multiple screening apparatus to cover a range of screening requirements, especially when it is desired to use a number of screen boxes in series.

It would, therefore, be desirable to provide a more flexible screening apparatus to mitigate this problem.

SUMMARY OF THE INVENTION

Accordingly, in one aspect, the invention provides a material screening apparatus adaptable between a reduced-bearing mode and an additional-bearing mode, the apparatus comprising: a screen box comprising at least one screen deck; a frame configured to support the screen box; a rotatable shaft coupled to the screen box for imparting vibrational and/or oscillatory motion to said at least one screen deck; and a first set of at least one bearings coupling said shaft to said screen box, wherein, in the additional-bearing mode only, a second set of at least one bearings couples the shaft to the frame.

Preferably, the shaft is configured to removably receive said second set of at least one bearings. In the additional-bearing mode the second set are fitted to the shaft and coupled to the frame, while in the reduced-bearing mode the second set are preferably removed.

Each set of bearings typically comprises first and second bearings, a respective one located on either side of the screen box. The second set, when fitted, are conveniently located outside of the first set, e.g. the respective bearings of the second set may be fitted to a respective end of the shaft, the respective bearings of the first set being located inwardly on the shaft.

The screen box may be coupled to the frame by a resilient coupling, for example comprising a spring support assembly.

Optionally, the shaft is weighted, for example eccentrically weighted. Optionally, at least one flywheel is carried by the shaft, for example a respective flywheel may be provided at each side of the screen box. The or each flywheel may be eccentrically mounted on the shaft. Optionally, the or each flywheel may be configured to carry one or more removable weights.

Optionally, the material screening apparatus comprises a drive means operable to impart rotational motion to the shaft. The drive means typically comprises a drive motor, for example a hydraulic drive motor. The drive means may be controllable by a hydraulic circuit. The drive means further comprises means for transferring rotational motion of the drive motor to the shaft, the transferring means conveniently comprising a belt and pulley assembly. The belt and pulley assembly typically comprises a drive belt; a drive pulley mounted on the drive shaft of the motor; and a driven pulley mounted on the shaft.

In preferred embodiments, the drive motor is incorporated into a drive assembly that is configurable between a movable (and preferably resiliently biased) state and fixed state to suit the mode of operation.

From another aspect, the invention provides a material screening assembly comprising at least two of said material screening apparatus of the first aspect of the invention, arranged in series. Advantageously, the at least two material screening apparatuses are arranged in an end-to-end relationship, wherein the discharge end of the upstream or first screen box is adjacent to the receiving end of the downstream or second screen box.

The preferred material screening assembly comprises first and second material screening apparatus, each having at least one screen deck disposed at a respective different screening angle. Preferably, the screening angle of the screen deck of the first material screening apparatus is fixed relative to the screening angle of the screen deck of the second material screening apparatus. The difference between the screening angle of the screen deck of the first material screening apparatus and the screening angle of the screen deck of the second material screening apparatus may be approximately 7° by way of example.

Advantageously, each screening apparatus of the screening assembly is independently configurable between the reduced-bearing mode and the additional-bearing mode. Preferably, the respective drive means, in particular the respective drive motor, of each screening apparatus of the screening assembly is independently operable, at least in respect of drive speed.

In a further aspect, the invention provides a method for converting a material screening apparatus of the invention between a reduced-bearing mode and an additional-bearing mode, wherein the method comprises involves fitting said second set of bearings to, or removing them from, the shaft, and reconfiguring the drive means. Reconfiguration of the drive means typically involves adjusting the drive speed (in particular raising the drive speed when transforming from reduced-bearing mode to additional-bearing mode and vice versa). Reconfiguration of the drive means may involve providing a sprung drive in the case of the reduced-bearing mode and a fixed drive in the case of the additional-bearing mode.

BRIEF DESCRIPTION OF THE DRAWINGS

An embodiment of the present invention will now be described, by way of example, with reference to the accompanying drawings, in which.

DESCRIPTION OF PREFERRED EMBODIMENTS

Figure 1:
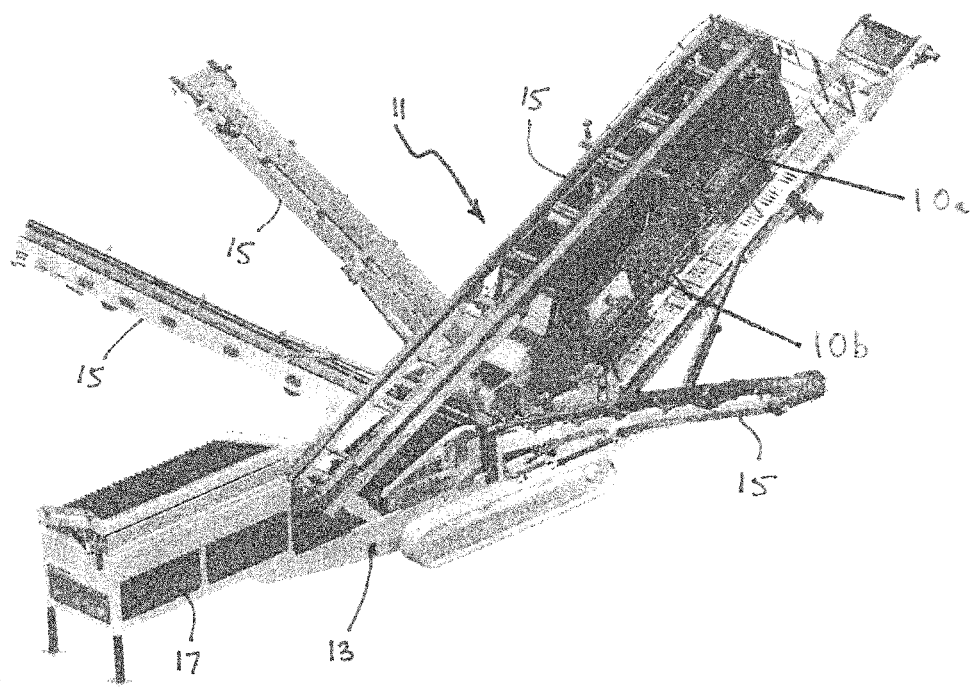
FIG. 1 is a perspective view of a material processing apparatus including two material screening apparatus embodying the present invention in an end-to-end arrangement.

Referring to FIG. 1, there is shown two embodiments 10a, 10b of a material screening apparatus according to the invention, each being incorporated into a material processing apparatus 11. Each material screening apparatus 10a, 10b is suitable for the screening or grading of particulate material, such as aggregate. The material screening apparatus 10a, 10b are disposed in an end-to-end, or series, arrangement. The screening apparatus 10a, 10b are preferably configured such their respective screen decks 14 are inclined with respect to one another about a transverse axis. In preferred embodiments, the angle of relative inclination is fixed. The material processing apparatus 11 also includes a base structure, typically comprising a chassis 13, which supports not only the screening apparatus 10a, 10b but also other material processing equipment, for example one or more conveyors 15 for feeding material to and from the screening apparatus 10a, 10b. The apparatus 11 may also include a hopper 17 for receiving material to be screened. The additional equipment is not further described herein since such description is not necessary for understanding the invention.

The following description of preferred material screening apparatus is applicable to both material screening apparatus 10a, 10b unless otherwise indicated, and the numeral 10 is used to refer to both apparatus 10a, 10b.

Figure 2:
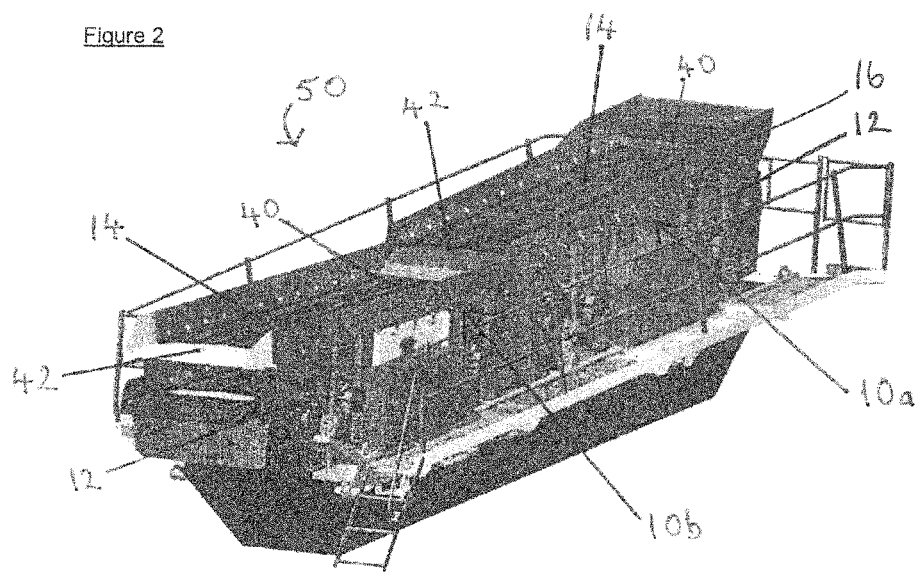
FIG. 2 a perspective view of two material screening apparatus embodying the invention in an end-to-end arrangement.

FIG. 2 depicts the two material screening apparatus 10a, 10b in closer detail. Each material screening apparatus 10 has a material receiving end 40 and a discharge end 42, wherein the discharge end 42 of the first material screening apparatus 10a is arranged to feed particulate matter to the receiving end 40 of the second material screening apparatus 10b. In use, particulate material is added at the receiving end 40 of a material screening apparatus 10, which is then vibrated to cause at least some of the material to pass through one or more screen decks 14 depending on the size of the material particles and the size of the screening apertures in each screen deck 14. Screened material may be discharged through one or more outlets (not shown). Any remaining material may be discharged from the discharge end 42 of the material screening apparatus 10 to, for example, a conveyor or a hopper.

The material screening apparatus 10 comprises a screen box 12 which includes the, or each, screen deck 14. Each screen deck 14 comprises a plurality of apertures for allowing passage of particulate material through the screen deck 14 (lower deck(s) typically having smaller apertures than the deck(s) above them). The screen decks 14 may be removable so that screen decks 14 with suitably sized apertures (determined by the desired application of the screening process) may be selected and fitted in the screen box 12.

The screen box 12 has opposing sidewalls 16 between which the screen decks 14 are located and by which they are supported. During use, each screen deck 14 may be maintained in a substantially horizontal disposition relative to the ground, or in an inclined disposition such that the receiving end 40 is at a raised height relative to the discharge end 42. This latter arrangement creates a non-zero screening angle relative to the horizontal position. Typically, the screening angle of each screen deck 12 is typically between approximately 20° and 40°, preferably between about 23° and 33.5°. The screening angle may be effected by the disposition of the screen box 12 with respect to the ground and/or the orientation of the screen decks 14 with respect to the screen box 12. The screen box 12 is supported by a frame 30, which is typically supported by, or is part of, the chassis 13. The angular disposition of the screen box 12 with respect to the ground may be adjustable by providing means for adjusting the angular disposition of the screen box 12 with respect to the frame 30 and/or means for adjusting the angular disposition of the frame 30 with respect to the chassis 30.

A rotatable shaft 18 is coupled to the screen box 12. In use the shaft 18 is driven rotationally about its longitudinal axis to impart vibrational and/or oscillatory motion to the screen deck(s) 14. The screen box 12 is coupled to the shaft 18 by a first pair of (inner) bearings 20a that are fitted around the shaft 18. The shaft 18 is adapted to receive a second pair of bearings 20b. The second pair of (outer) bearings 20b are preferably located outside of the first pair 20a (with respect to the apparatus 10) and to this end the shaft 18 projects beyond the first pair 20a at each side to provide space for a respective one of the second bearings 20b to be fitted (removably) to the shaft 18. The second bearings 20b are mounted on or otherwise coupled to the frame 30. In the illustrated embodiment, the second bearings 20b are incorporated into a mounting structure 21 for this purpose. The mounting structure 21 may be fixed to the frame 30 in any convenient manner, typically via a resilient, e.g. rubber, mount 37.

Figure 4:
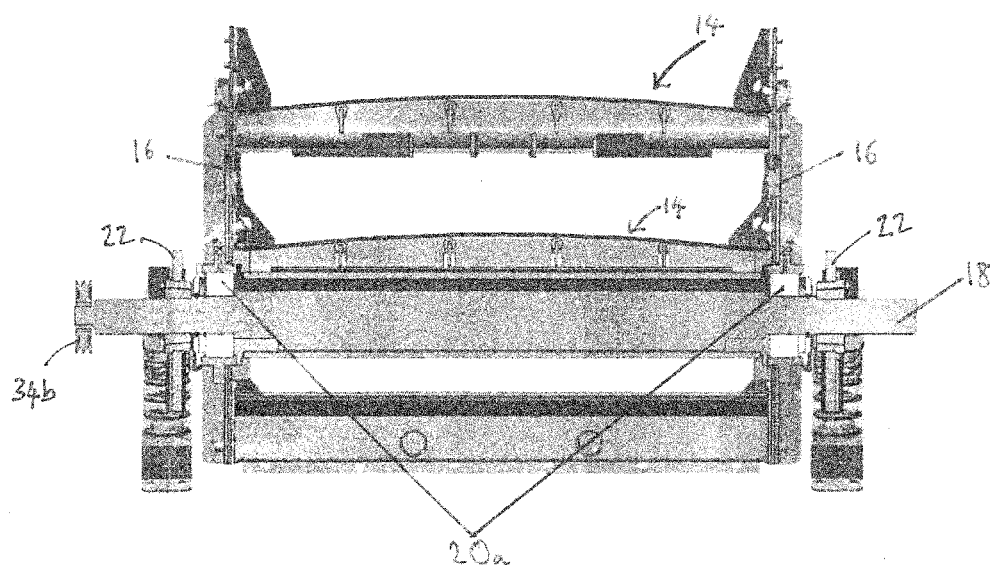
FIG. 4 is a longitudinal sectional view of the apparatus of FIG. 3 configured in two-bearing mode.

The material screening apparatus 10 is adaptable between a reduced-bearing mode and an additional-bearing mode, which in the present example correspond respectively with a two-bearing mode in which only the first bearings 20a are present (see FIG. 4) and a four-bearing mode in which both sets of bearings 20a, 20b are present. In the two-bearing mode, the coupling between the screen box 12 and the frame 30 comprises a spring assembly 29 (or other resilient coupling means), the weight of the screen box 12 being transmitted to the frame 30 substantially by the springs 29. In the two-bearing mode, the coupling between the screen box 12 and the frame 30 allows the screen box 12 and shaft 18 to move relative to the frame 30 when the shaft 18 is driven, and in particular allows relatively large (in comparison with the four-bearing mode) oscillatory movement of the screen box 12. In the four-bearing mode, the screen box 12 is coupled to the frame 30 via the shaft 18 and the second bearings 20b and so at least part of the weight of the screen box 12 is transmitted to the frame 30 via the second bearings 20b. The bearings 20b restrict movement of the shaft 18, and therefore the screen box 12, with respect to the frame 30.

The term "bearing 20" is used hereafter to refer to an individual bearing of either of the first or second pairs of bearings 20a, 20b, whereas each pair of bearings is referred to as either the "first pair of bearings 20a" and "the second set of bearings 20b", as appropriate.

As described further herein, the conversion of the material screening apparatus 10 from the two-bearing mode to the four-bearing mode, or from the four-bearing mode to the two-bearing mode, changes the screening characteristics of the apparatus 10, and in turn the screening characteristics of the screening process carried out by the apparatus 10.

The shaft 18 is disposed substantially transversely of the screen box 12, i.e. substantially perpendicular to the path of movement of particulate matter along the screen box 12. The shaft 18 is typically located between the material receiving end 40 and the discharge end 42. The ends of the shaft 18 extend through the opposing walls 16 of the screen box 12. Conveniently, a respective one of the first bearings 20a is located substantially at each wall of the screen box 12, the respective end of the shaft 18 passing through the respective wall and the respective first bearing 20a. In use, the shaft 18 transmits vibrational and/or oscillatory motion to the screen box 12 via the first bearings 20a. The resultant vibrations/oscillations of the screen deck(s) 14 cause stratification of the material on the screen deck(s) 14 and the movement of material that has not passed through the screen along the screen deck(s) 14, to be discharged via the discharge end 42. Each end of the shaft 18 is rotatably mountable through a respective bearing 20 from each of the first pair of bearings 20a and the second pair of bearings 20b, when present. The bearings 20 are typically annular and may take any conventional form, e.g. comprising balls or rollers contained in a grooved track, or a bushing.

The material screening apparatus 10 furthers comprise drive means operable to impart rotational motion to the shaft 18, which in turn imparts vibratory and/or oscillatory motion to the screen box 12 and screen deck(s) 14. The drive means may comprise a motor 24 coupled to the shaft 18. In this example the motor 24 has a rotatable drive shaft 25 which carries a drive pulley 34a. A driven pulley 34b is carried by the shaft 18, the pulleys 34a, 34b being linked by a drive belt 26. The pulley 34b is releasably coupled to the shaft 18, typically by means of a taperlock 35. In the preferred embodiment, the taperlock 35 is concentrically mounted on the shaft 18.

The motor 24 may be powered in any convenient manner. In typical embodiments, the motor 24 is a hydraulic motor. The rotational speed of the drive motor 24 may be varied by an operator depending on the level of vibratory motion required to be transmitted to the screen deck(s) 14 for a particular application. Due to the generation of relatively large oscillations in the two-bearing mode compared to the four-bearing mode, it is typical to run the motor 24 at greater speeds in the four-bearing mode compared to the two-bearing mode, e.g. 1140 revolutions per minute (rpm) compared to 900 rpm, which further contributes to the different screening characteristics of the material screening apparatus 10.

Figure 8:
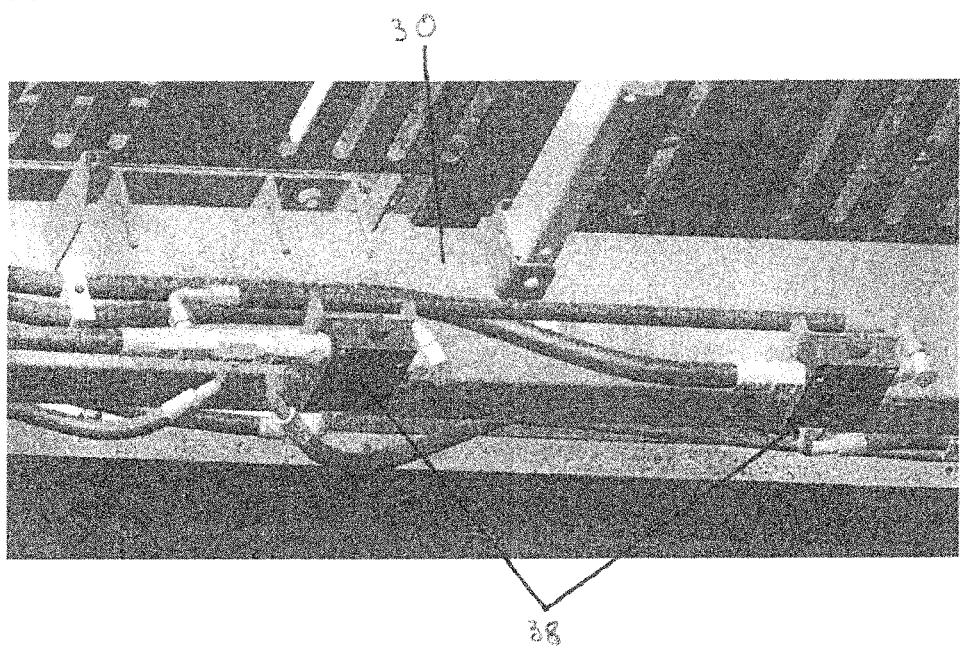
FIG. 8 is a perspective view of flow control and pressure relief means located on the frame of the material screening apparatus embodying the invention.

In the preferred embodiment the motor 24 is hydraulically operated by a hydraulic circuit (part of which is shown in FIG. 8). The speed of the motor 24 may be adjusted by controlling the flow of hydraulic fluid in the circuit in any convenient conventional manner. When the material screening apparatus 10 is converted between the two-bearing mode and four-bearing mode, the hydraulic circuit is operated to adjust the rotational speed accordingly. The hydraulic circuit may take any convenient conventional configuration (typically including a pressure relief valve 38) and may be mounted for example, on the frame 30.

Figure 3:
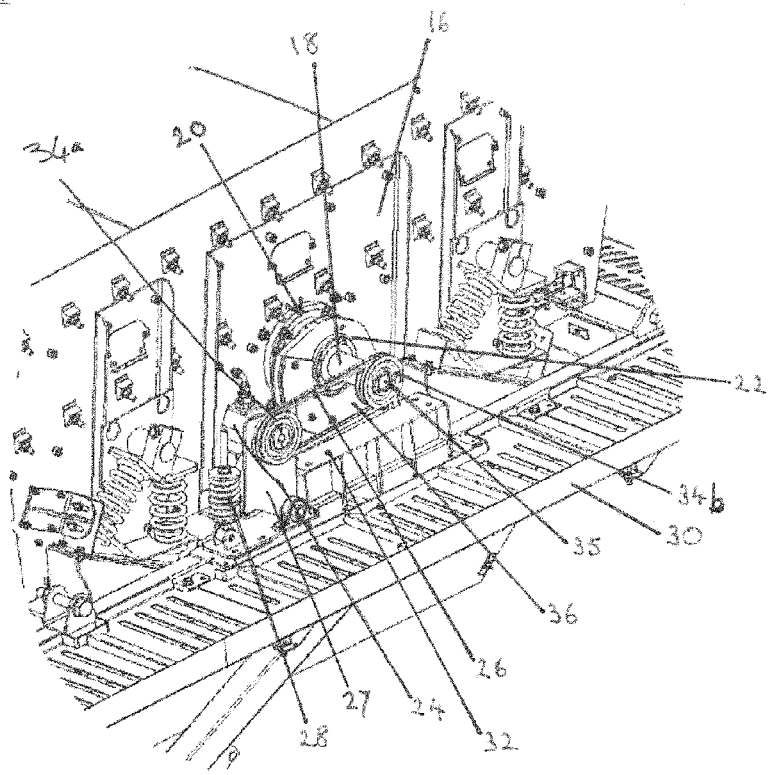
FIG. 3 is a partial perspective view of a material screening apparatus embodying the invention configured in two-bearing mode.
Figure 5:
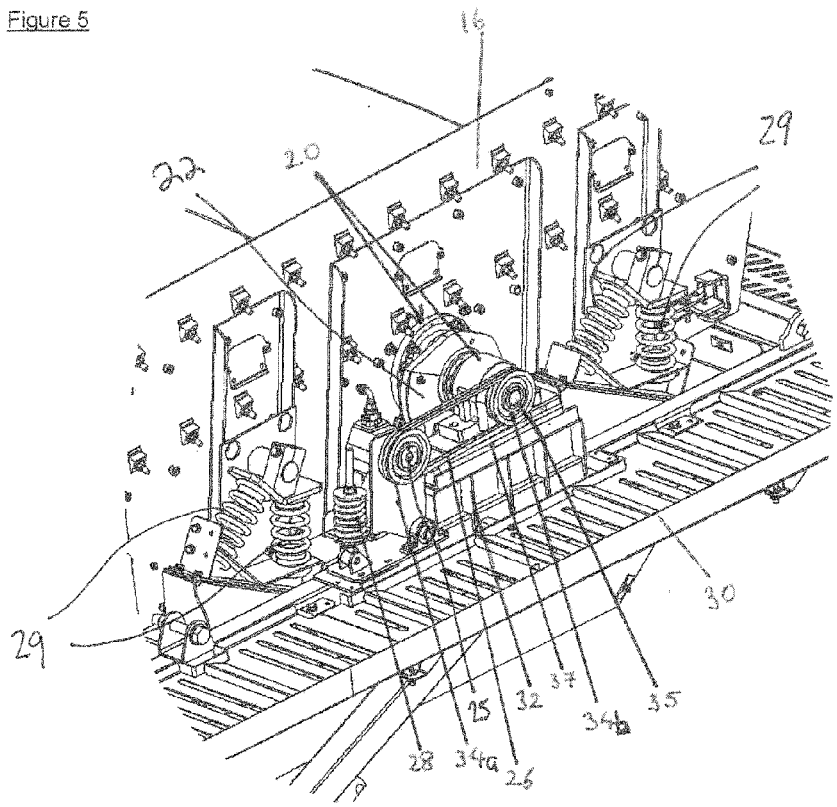
FIG. 5 is a partial perspective view of a material screening apparatus embodying the invention configured in four-bearing mode.
Figure 6:
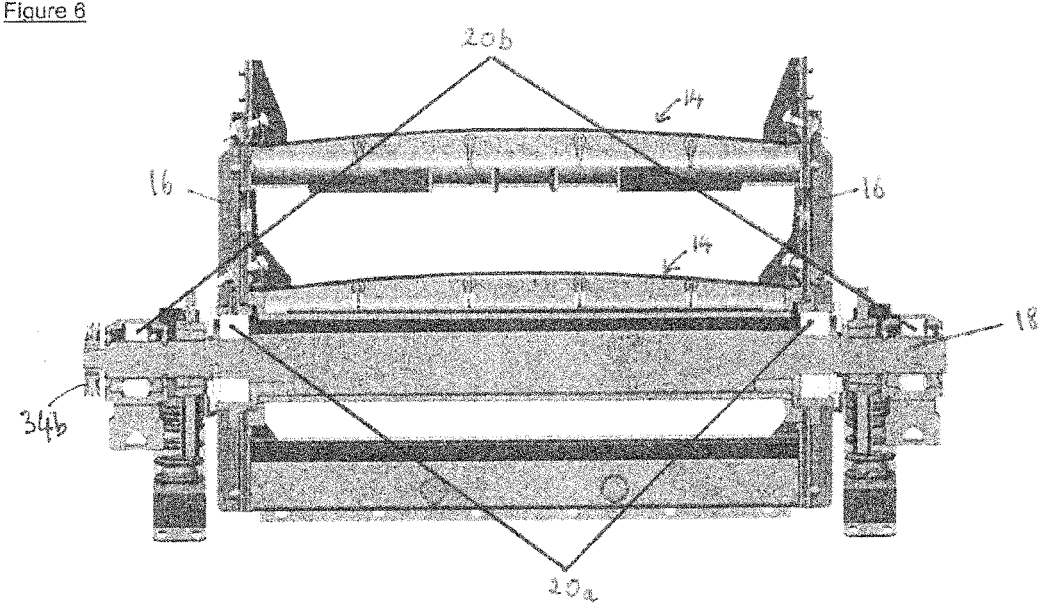
FIG. 6 is a longitudinal sectional view the material screening apparatus of FIG. 5 configured in four-bearing mode.

In the two-bearing mode (FIG. 3), the drive means, and in particular the drive assembly comprising the motor 24, shaft 25 and drive pulley 34a, is movable and resiliently biased with respect to the frame 30. In the illustrated embodiment, the drive assembly is carried by a support frame 27 that is coupled, e.g. pivotably or slidably as is convenient, to the frame 30 and resiliently biased, in this case by spring 28, to allow resiliently biased movement of the drive assembly with respect to the frame 30. The arrangement is such that the drive assembly moves against its resilient bias in response to movement of the screen box 12 to ensure that sufficient tension is maintained in the belt 26 to drive the shaft 18. In the four-bearing mode (FIG. 5), the drive means, and in particular the drive assembly comprising the motor 24 and drive pulley 34a, is fixedly-mounted to the frame 30. This may be achieved by fixing the support frame 27 with respect to the frame 30. In the preferred embodiment, a fixing device (not shown), which may take any convenient form e.g. comprising a bolt, or a latch or a locking mechanism, is provided to releasably fix the support frame 27 with respect to the frame 30. The fixing device may for example be coupled to spring 28 to lock the spring 28 in order to prevent movement of the frame 27 relative to the frame 30. In the two-bearing mode, the fixing device adopts a released state to allow movement of the frame 27, while in the four-bearing mode, the fixing device adopts a fixing state to prevent movement of the frame 27. Hence, the preferred drive assembly is configurable between a movable (and preferably resiliently biased) state and fixed state to suit the mode of operation.

In the two-bearing mode, the shaft 18 is coupled to the screen box 12 by the first pair of bearings 20a. In the four-bearing mode, the shaft 18 is also coupled to the screen box 12 by the first pair of bearings 20a but is, in addition, coupled to the frame 30 at the second pair of bearings 20b (in particular by the mounting 21 that houses the bearing 20b). The coupling between the shaft 18 and the frame 30 provided by the bearings 21b restricts non-rotational relative movement of the shaft 18 with respect to the frame 30. Accordingly, in the two-bearing mode, the shaft 18 is able to generate larger oscillations than in the four-bearing mode, which contributes to the different screening characteristics generated in each mode.

The shaft 18 may be weighted, for example eccentrically weighted, in order to promote vibrations and/or oscillations for transmission to the screen deck(s) 14 when the shaft 18 is rotating. The shaft 18 may carry one or more flywheels 22, which provide shaft weighting and may be eccentrically mounted on the shaft 18 and may provide or contribute to vibrations/oscillations, particularly in the two-bearing mode. In the four-bearing mode, the action of the flywheels 22 may damp the vibratory motion created by the rotating shaft 18. The action of the flywheel 22 in either or both modes may be altered by adding weight(s) to or removing weight(s) from the flywheel 22. The preferred offset in the four bearing shaft 18 means that an offset taperlock is not required.

In preferred embodiments, and as can best be seen from FIG. 2, two or more screening apparatus 10a, 10b are provided end-to-end to form a material screening assembly 50 to allow material to be screened by each apparatus 10a, 10b in series. To this end, the discharge end 42 of the first material screening apparatus 10a is adjacent to the receiving end 40 of the second material screening apparatus 10b. An advantage of the screening assembly 50 is that each material screening apparatus 10a, 10b can be operated simultaneously and configured to have different screening characteristics as determined, for example, by the characteristics of the vibrations or oscillations imparted to the respective screen boxes 12 and screen decks 14, and/or the use of different screening angles. This is facilitated by being able to select independently to operate each screening apparatus 10 in either two-bearing mode or four-bearing mode. Advantageously, the drive means for each material screening apparatus 10 of the assembly 50 is operable independently of the other, e.g. by means of a respective independently operable hydraulic circuit in the present example. This facilitates not only running each apparatus 10 in either the two-bearing mode or four-bearing mode independently of the other, but also allows respective independent adjustment of motor 24 speed to tune out any harmonics that may occur in the respective vibration/oscillation of each apparatus 10. Another advantage is that multiple, smaller material screening apparatus are more robust and can be operated more forcefully than, for example, a single, long material screening apparatus.

The first and second material screening apparatus 10a, 10b may also have respective screen decks 14 having screening angles that may be the same or may be different. The screening angles are typically between about 20° and 40°, and further optionally between about 23° and 33.5°. It is preferred that the screen decks 14 of a given screen box 12 are substantially parallel with one another. It is also preferred that, in the screening assembly 50, respective screening angle of one screening apparatus 10 is different to the screening angle of the, or each, adjacent screening apparatus 10. In the example of FIG. 2, the screening angle of the first screening apparatus 10a is different to the screening angle of the second screening apparatus 10b. The difference between the respective screening angles may be between approximately 1° and 30°, optionally between about 1° and 20°, optionally between about 1° and 10°, preferably approximately 7°. In preferred embodiments, the difference between the screening angles of adjacent screening apparatus is fixed.

From another aspect the present invention provides a method for converting a material screening apparatus 10 between the two-bearing mode and the four-bearing mode. The method involves fitting the second pair of bearings 20b to, or removing them from, the shaft 18 and reconfiguring the drive means. Reconfiguration of the drive means typically involves adjusting the drive speed (in particular raising the drive speed when transforming from two-bearing mode to four-bearing mode and vice versa). Reconfiguration of the drive means may involve providing a sprung drive in the case of the two-bearing mode and a fixed drive in the case of the four-bearing mode.

Figure 7:
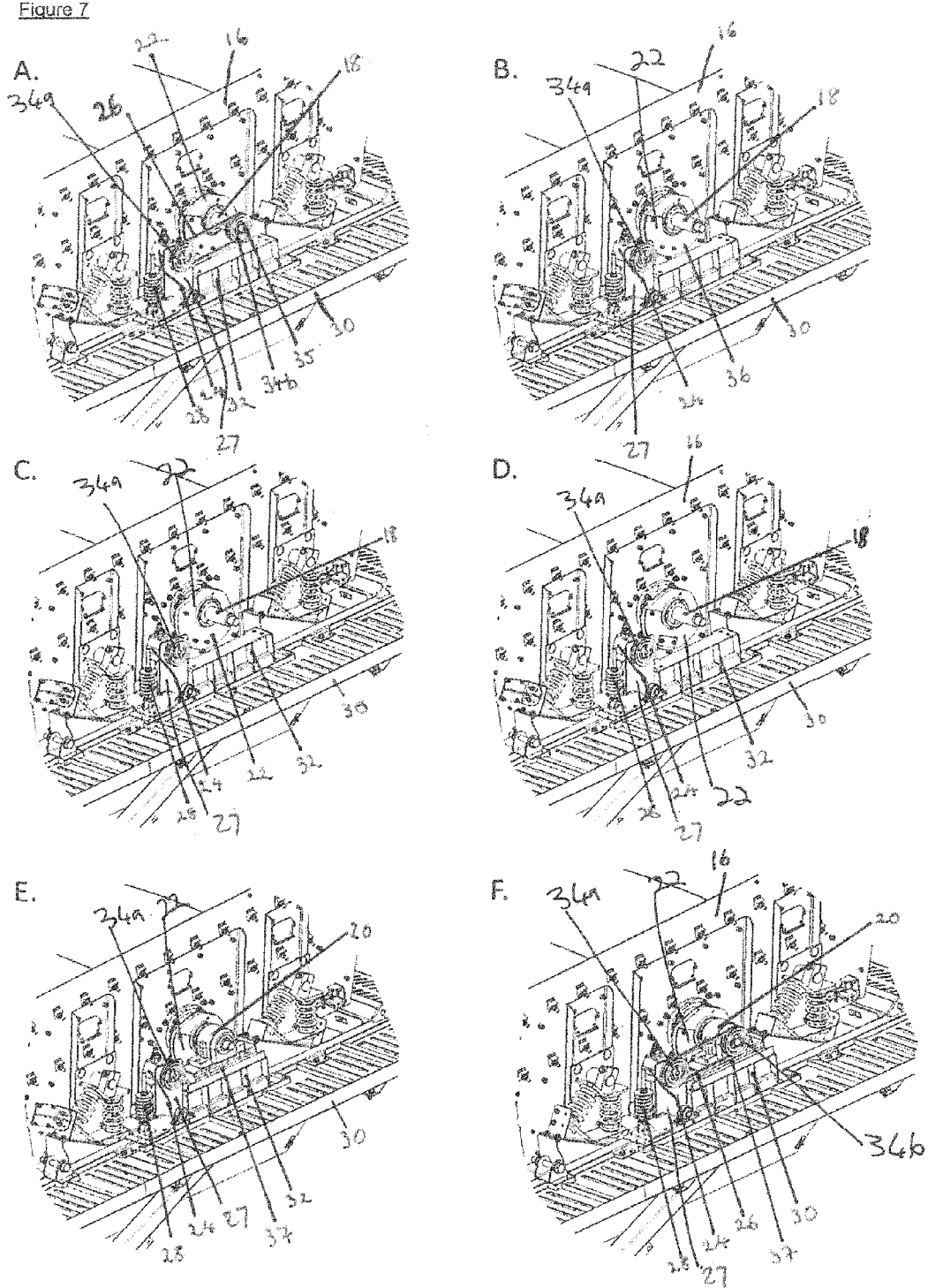
FIG. 7 (A-F) depicts a method for converting a material screening apparatus from a two-bearing mode to a four-bearing mode.

FIGS. 7 A-F illustrate the conversion of the material screening apparatus 10 from the two-bearing mode to the four-bearing mode. In FIG. 7A, the screen box 12 is shown in the two-bearing mode. A guard (not shown), which is typically provided to occlude the drive motor 24, belt 26 and pulleys 34a, 34b, has been removed. The drive belt 26 is then de-tensioned and removed, and the driven pulley 34b and the taperlock 35 detached from each end of the shaft 18 (FIG. 7B). Counterweights 36 from the outside of the flywheel 22 may be removed (FIG. 7C) and lighter flywheel weight(s) and small balance weight(s) may be attached to the flywheel 22 (FIG. 7D). The mount 37 may then be secured to the frame 30 (via subframe 32 in this example). Advantageously, all of the brackets necessary for the mount 37 and mounting structure 21 may be fitted to the frame 30/subframe 32 in advance. The second pair of bearings 20b may then be fitted to the shaft 18 (FIG. 7E) together with the mounting structure 21. The driven pulley 34b and the taperlock 35 may be refitted to each end of the shaft 18, and the drive belt 26 refitted. One or more vibration isolators (for example, Lord™ mounts) may be removed from either side of the screen box 12. The operation of the drive motor 24 may then be adjusted to suit four-bearing mode. The described method to convert a material screening apparatus 10 from a two-bearing mode to a four-bearing mode is estimated to take approximately 3 hours. By carrying out this method in reverse, the material screening apparatus 10 may be returned to the two-bearing mode.

The invention is not limited to the embodiment described herein but can be amended or modified without departing from the scope of the present invention.

The invention claimed is:

1. A material screening apparatus adaptable between a reduced-bearing mode and an additional-bearing mode, the apparatus comprising: a screen box comprising at least one screen deck; a frame, the screen box being coupled to the frame; a rotatable shaft coupled to the screen box for imparting vibrational and/or oscillatory motion to said at least one screen deck; drive means operable to impart rotational motion to the shaft; and bearings coupling said shaft to said screen box, said bearings providing a reduced-bearing mode and an additional-bearing mode wherein a first set of at least one of said bearings couples said shaft to said screen box in said reduced-bearing mode, wherein, in the additional-bearing mode only, the first set and a second set of at least one of said bearings couples the shaft to the frame.

2. The apparatus of claim 1, wherein the shaft is configured to removably receive said second set of at least one bearings.

3. The apparatus of claim 1, wherein in the reduced-bearing mode the second set are preferably removed.

4. The apparatus of claim 1, wherein each set of bearings comprises first and second bearings, a respective one located on either side of the screen box.

5. The apparatus of claim 1, wherein the second set, when fitted, are located around the shaft outwardly of the first set.

6. The apparatus of claim 1, wherein the screen box is coupled to the frame by coupling means that allows oscillatory movement of said screen box with respect to said frame.

7. The apparatus of claim 6, wherein said coupling, means comprises one or more spring support assembly.

8. The apparatus of claim 1 wherein the shaft is weighted, for example eccentrically weighted.

9. The apparatus of claim 1, wherein at least one flywheel is carried by the shaft, for example a respective flywheel may be provided at each side of the screen box.

10. The apparatus of claim 9, wherein said at least one flywheel is eccentrically mounted on the shaft.

11. The apparatus of claim 9, wherein the or each flywheel is configured to carry one or more removable weights.

12. The apparatus of claim 1, wherein the drive means comprises a drive motor, for example a hydraulic drive motor.

13. The apparatus of claim 1, wherein the drive means comprises means for transferring rotational motion of the drive motor to the shaft, the transferring means for example comprising a belt and pulley assembly.

14. The apparatus of claim 1, wherein the drive motor is incorporated into a drive assembly that is movably coupled, preferably under resilient bias, to the frame in the reduced-bearing mode and fixed with respect to the frame in the additional bearing mode.

15. A material screening assembly comprising at least two of said material screening apparatus of claim 1 arranged in series.

16. The assembly of claim 15, wherein the at least two material screening apparatuses are arranged in an end-to-end relationship, wherein the discharge end of the upstream or first screen box is adjacent to the receiving end of the downstream or second screen box.

17. The assembly of claim 15, comprising first and second material screening apparatus, each having at least one screen deck disposed at a respective screening angle, the screening angle of the first apparatus being different than the screening angle of the second screening apparatus.

18. The assembly of claim 15, wherein the screening angle of the screen deck of the first material screening apparatus is fixed relative to the screening angle of the screen deck of the second material screening apparatus.

19. The assembly of claim 15, wherein the difference between the screening angle of the screen deck of the first material screening apparatus and the screening angle of the screen deck of the second material screening apparatus is approximately 7°.

20. The assembly of claim 15, wherein each screening apparatus of the screening assembly is independently configurable between the reduced-bearing mode and the additional-bearing mode.

21. The assembly of claim 15, wherein the respective drive means, in particular the respective drive motor, of each screening apparatus of the screening assembly is independently operable, for example in respect of drive speed.

* * * * *

UNITED STATES PATENT AND TRADEMARK OFFICE
CERTIFICATE OF CORRECTION

| | | |
|---|---|---|
| PATENT NO. | : 9,296,017 B2 | Page 1 of 1 |
| APPLICATION NO. | : 14/614501 | |
| DATED | : March 29, 2016 | |
| INVENTOR(S) | : Neil Robinson | |

It is certified that error appears in the above-identified patent and that said Letters Patent is hereby corrected as shown below:

In the Claims

Claim 1, Col. 8, Line 37: "mode only, the first set and a second set"; should be "mode only, a second set"

Signed and Sealed this
Thirty-first Day of May, 2016

Michelle K. Lee
*Director of the United States Patent and Trademark Office*